(12) United States Patent
Morcom

(10) Patent No.: US 8,354,928 B2
(45) Date of Patent: Jan. 15, 2013

(54) INTRUDER DETECTION SYSTEM

(75) Inventor: Christopher John Morcom, Broadstairs (GB)

(73) Assignee: Instro Precision Limited, Broadstairs, Kent (GB)

( * ) Notice: Subject to any disclaimer, the term of this patent is extended or adjusted under 35 U.S.C. 154(b) by 670 days.

(21) Appl. No.: 12/514,789

(22) PCT Filed: Nov. 12, 2007

(86) PCT No.: PCT/GB2007/004309
§ 371 (c)(1),
(2), (4) Date: Dec. 18, 2009

(87) PCT Pub. No.: WO2008/059216

PCT Pub. Date: May 22, 2008

(65) Prior Publication Data

US 2010/0097216 A1    Apr. 22, 2010

(30) Foreign Application Priority Data

Nov. 14, 2006 (GB) .................................. 0622681.5
May 18, 2007 (GB) .................................. 0709618.3

(51) Int. Cl.
*G08B 13/18* (2006.01)
(52) U.S. Cl. ........................................ 340/555; 340/556
(58) Field of Classification Search .................. 340/555, 340/556, 572.1, 541
See application file for complete search history.

(56) References Cited

U.S. PATENT DOCUMENTS

| 4,311,383 | A |   | 1/1982 | Ohtsubo |
| 5,134,386 | A | * | 7/1992 | Swanic .......................... 340/541 |
| 5,877,851 | A |   | 3/1999 | Stann et al. |
| 6,307,622 | B1 |  | 10/2001 | Lewis |
| 7,023,341 | B2 | * | 4/2006 | Stilp .......................... 340/572.1 |
| 7,280,607 | B2 | * | 10/2007 | McCorkle et al. ............. 375/295 |
| 7,411,497 | B2 | * | 8/2008 | Kates ........................... 340/556 |

FOREIGN PATENT DOCUMENTS

| DE | 4226543 A1 | 2/1994 |
| DE | 19744319 A1 | 4/1998 |
| DE | 19949803 A1 | 4/2000 |
| DE | 19947023 A1 | 5/2001 |
| EP | 0714081 A1 | 5/1996 |
| EP | 1252535 A1 | 10/2002 |
| EP | 1373830 A1 | 1/2004 |
| EP | 1374002 A1 | 1/2004 |
| JP | 2002-334382 A | 11/2002 |
| JP | 2002334382 A | 11/2002 |
| JP | 2003-263685 A | 9/2003 |
| JP | 2004309423 A | 11/2004 |
| WO | WO 2006/048604 A1 | 5/2006 |

* cited by examiner

*Primary Examiner* — John A Tweel, Jr.
(74) *Attorney, Agent, or Firm* — Blakely, Sokoloff, Taylor & Zafman

(57) ABSTRACT

An intruder detection system comprises an illumination means for illuminating a field of view with a modulated optical signal, modulated by a modulation signal; an optical receiver for receiving a delayed reflected signal; a cross correlator for calculating a cross correlation function between the modulation signal and the received delayed reflected signal; and means for detecting changes in the cross correlation function, a change being used to provide intruder detection. This system uses optical sensing and cross correlation calculation to enable an intruder detection signal to be obtained. This can enable a solid state, low cost, and reliable sensor to be provided for detecting intruders.

31 Claims, 6 Drawing Sheets

INTRUDER DETECTION SYSTEM

Figure 1:
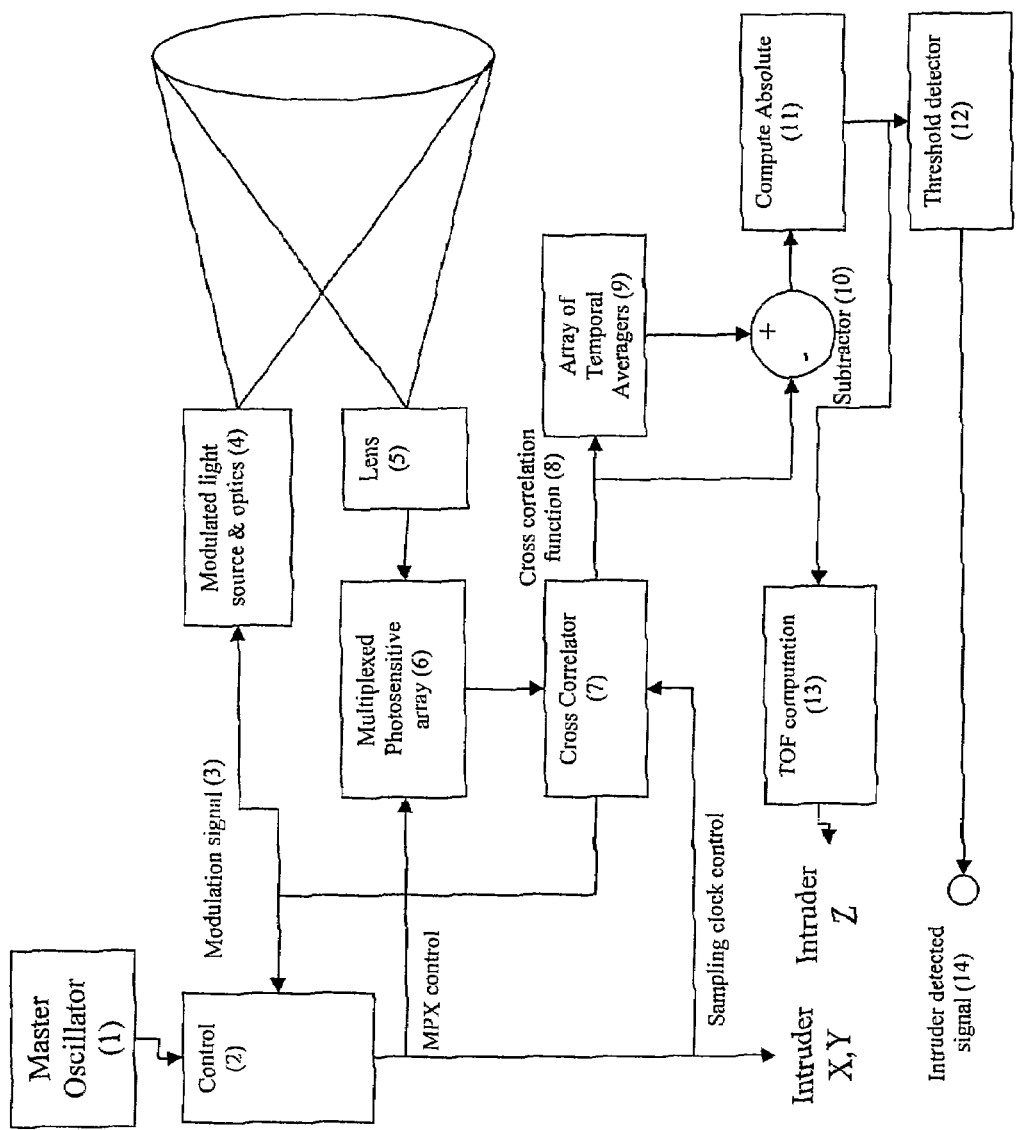

This is a non-provisional application claiming the benefit of International application number PCT/GB2007/004309 filed Nov. 12, 2007.

This invention relates to intruder detection systems.

There is a growing demand for low cost systems able to reliably detect intruders both within and around the perimeter of sensitive facilities and locations.

Many approaches have been developed which are able to detect intruders, but they are costly to manufacture or suffer from reliability problems, either warning of intruders when there are none present (false positives) or failing to warn of intruders that are present (false negatives).

The simplest systems available use passive infra red (PIR) detectors which use a staring detector or detectors sensitive to changes in thermal radiation. Such sensors detect intruders through the change in thermal radiation caused by an intruder entering the field of view of the detector. Such systems are very low cost but have a limited operating range (around 10 m) and fail to detect very slowly moving intruders as the temperature change induced is too low.

More complex systems based on mechanically or electrically scanned microwave Doppler radar have been employed. Here intruders are detected by the Doppler shift induced by their motion. However, such systems are expensive and find it difficult to detect very slow moving or small targets such as a slowly crawling man. An example of such a system is the Plextek "Blighter" E-scan radar.

Video motion detection (VMD) based solutions are based on digitally processing the images of a scene captured by a video camera to look for changes in the image that may indicate the presence of an intruder. Whilst such systems are significantly cheaper than radar systems, they tend to suffer from a high level of false positives because it is difficult for the VMD image processing algorithms to distinguish between changes in an image due to an intruder and, for example, foliage moving in the wind or changes in the image due to weather or illumination conditions. This significantly reduces their effectiveness and increases running costs as a high level of human supervision and intervention is required.

Scanned laser radar systems have also been employed where a laser rangefinder is mechanically scanned across a region of interest. The laser rangefinder measures the distance from the scanner to the scanned point within the region of interest and thus allows the system to learn the topology of the region of interest. Once the topology has been learned, which typically takes several scans, the system is able to detect changes in the topology caused by the presence of intruders. However, to reliably detect the presence of an intruder requires the system to measure the topology with a high degree of accuracy and repeatability; typically in the region of centimeters. This increases the system cost due to the high precision needed in the mechanics of the scanner and the very high timing precision (fractions of a nanosecond) required to measure the topology. It also limits the scan rate to one scan every few seconds.

The limited scan rate makes it difficult to reliably detect fast moving intruders as they may only be detected in one scan, which could equally be caused by, for example, a bird flying into the region of interest.

A further limitation is that these known systems are only able to detect the presence of the intruder, and cannot positively identify the intruder to determine whether the intruder is authorised or not to be in the region of interest (ROI). For many security applications this is a significant problem as is often a flow of authorised personnel/vehicles within the ROI and the task is to determine those intruders who are not authorised to be there.

There are a number of technologies which could potentially carry out such remote identification including biometric methods such as face or gait recognition, but these rely on very high quality images and high levels of processing power for successful operation which is costly. In addition such systems are relatively easy to defeat using simple means such as physical disguises.

Radio frequency identification devices (RFID) could also be used, but generally such devices have a short range and in any case require additional infrastructure to implement. In addition, for remote observation systems such as CCTV, there is always the difficult problem of positively and accurately correlating the detected intruder with a particular RFID within the ROI, particularly if there are more than 1 intruder detected.

According to a first aspect of the invention, there is provided an intruder detection system, comprising:

an illumination means for illuminating a field of view with a modulated optical signal, modulated by a modulation signal;

an optical receiver for receiving a delayed reflected signal;

a cross correlator for calculating a cross correlation function between the modulation signal and the received delayed reflected signal; and means for detecting changes in the cross correlation function, a change being used to provide intruder detection.

This system uses optical sensing and cross correlation calculation to enable an intruder detection signal to be obtained. This can enable a solid state, low cost and reliable sensor to be provided for detecting intruders.

The cross correlation function effectively provides a map of reflectivities with distance. In particular, the cross correlation function will have peaks at times corresponding to distances at which objects are located, and the intensity of these peaks is representative of a reflectivity of the object. Thus, the system uses both the surface reflectivity and distance of remote objects to characterise a field of view.

The correlation function thus preferably comprises a series of correlation calculations for different time shift values.

The means for detecting changes may comprise means for comparing the cross correlation function received with an average of previously received cross correlation functions. The use of an average cross correlation function enables the reference point to evolve, for example with changing lighting conditions. This also enables noise to be averaged out. A sudden change in the correlation function is detected by the detecting means.

A threshold detection means can be used for threshold detection within a difference signal between the cross correlation function and the average of previously received cross correlation functions. This is used to distinguish between an intruder and other changes in the field of view, for example changes outside a window.

The optical receiver can comprise an array of photodetectors, for example a photodiode array. This provides a low cost implementation.

Time of flight measurement circuitry can also be used for calculating a range to an intruder based on the detected changes in the cross correlation function.

The system may further comprise means for deriving a direction to an intruder from the cross correlation function.

For example, the optical receiver can comprise a multi region photosensor array, and deriving a direction can be based on which region or regions of the detector result in the intruder detection signal.

This direction information can be used to control a direction of a camera. The range information can also be used to control the camera focus.

In a modification, the system further comprises an electronic tag for an authorised intruder, wherein the system is adapted to provide an alarm if a non-authorised intruder is detected, and not to provide an alarm if an authorised intruder is detected. This provides intruder identification as well as detection.

The tag can comprise a code generator and optical transmitter, for transmitting a modulated code signal in response to detection of the modulated optical signal. The tag preferably comprises means for synchronising the modulated code signal with the detected modulated optical signal, so that the signal can be received by the system with the reflected signal. The means for synchronising can comprise a tag cross correlator and a peak detector for deriving a synchronisation signal from the detected modulated optical signal.

A code can then be extracted from the signal received by the optical receiver which receives the delayed reflected signal. Thus, the main receiver of the system (as opposed to the tag) can simultaneously perform intruder detection based on the reflected signal, and intruder identification based on a modulated signal received with the reflected signal.

According to a second aspect of the invention, there is provided an intruder detection system comprising means for emitting a modulated signal and detecting a reflected signal from an intruder, and further comprising an electronic tag for an authorised intruder, wherein the system is adapted to provide an alarm if a non-authorised intruder is detected, and not to provide an alarm if an authorised intruder is detected. The tag is preferably adapted to detect the modulated signal and provide a signal in response which encodes electronic tag identification information.

The first aspect of the invention also provides a method of detecting an intruder, comprising:
illuminating a field of view with a modulated optical signal, modulated by a modulation signal;
receiving a delayed reflected signal;
calculating a cross correlation function between the modulation signal and the received delayed reflected signal; and
detecting changes in the cross correlation function, a change being used to provide intruder detection.

The method can also provide intruder identification in the same way as above, by providing an authorised intruder with an electronic tag, and providing an alarm if a non-authorised intruder is detected, and not providing an alarm if an authorised intruder is detected.

Figure 2:
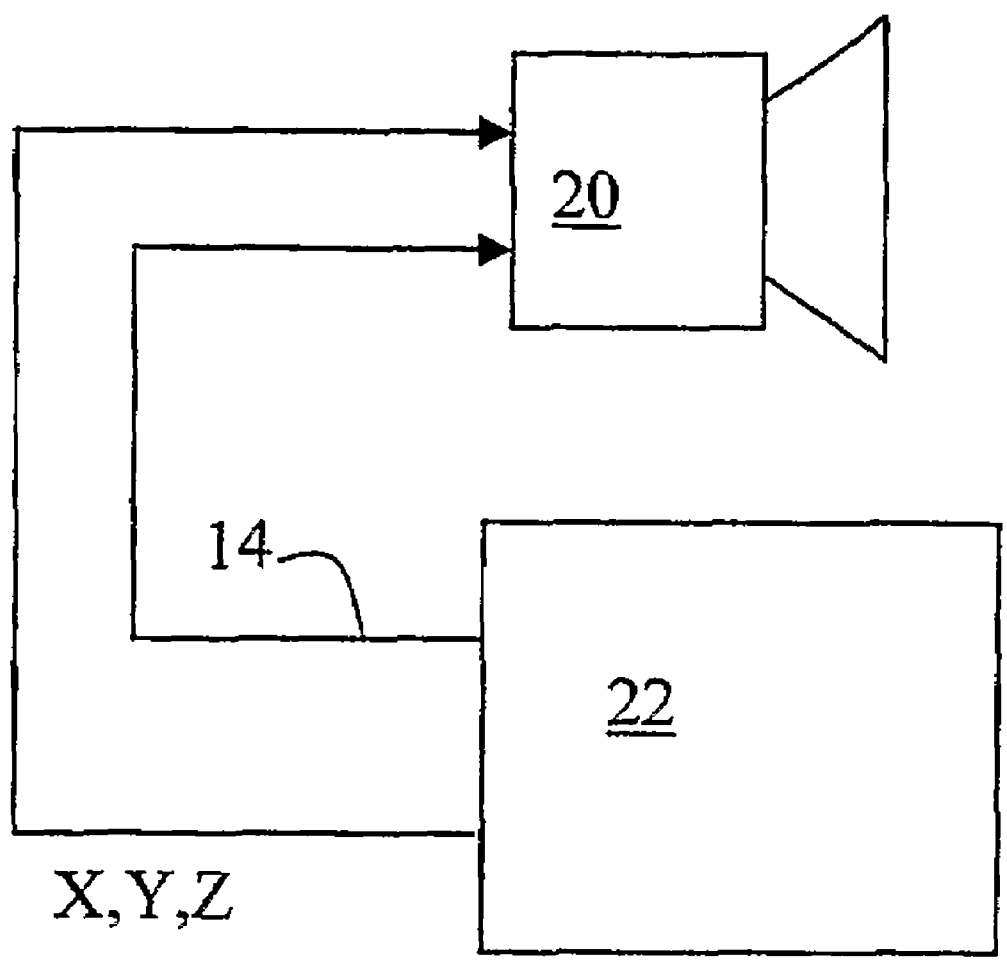
Figure 3:
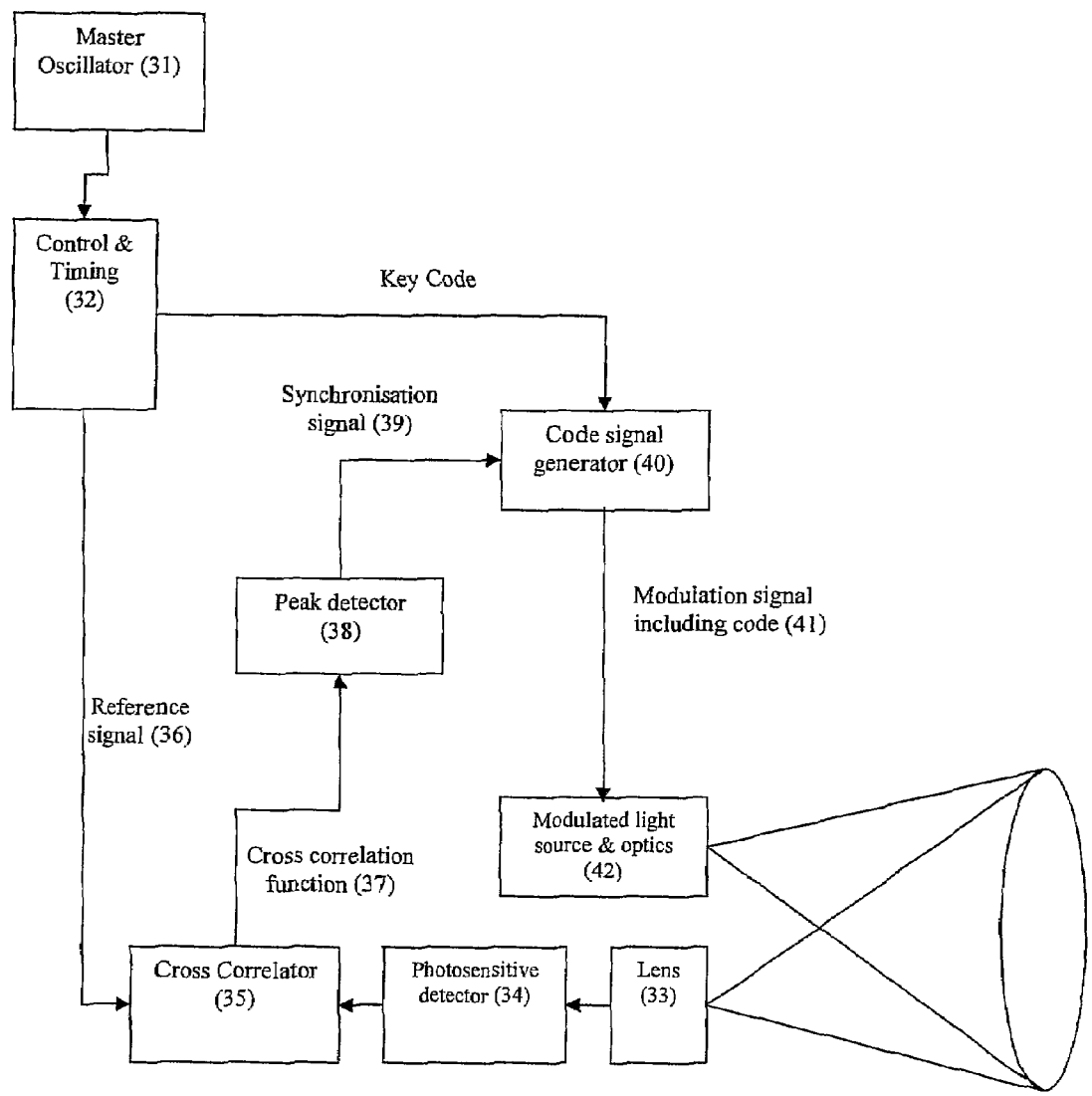
Figure 4:
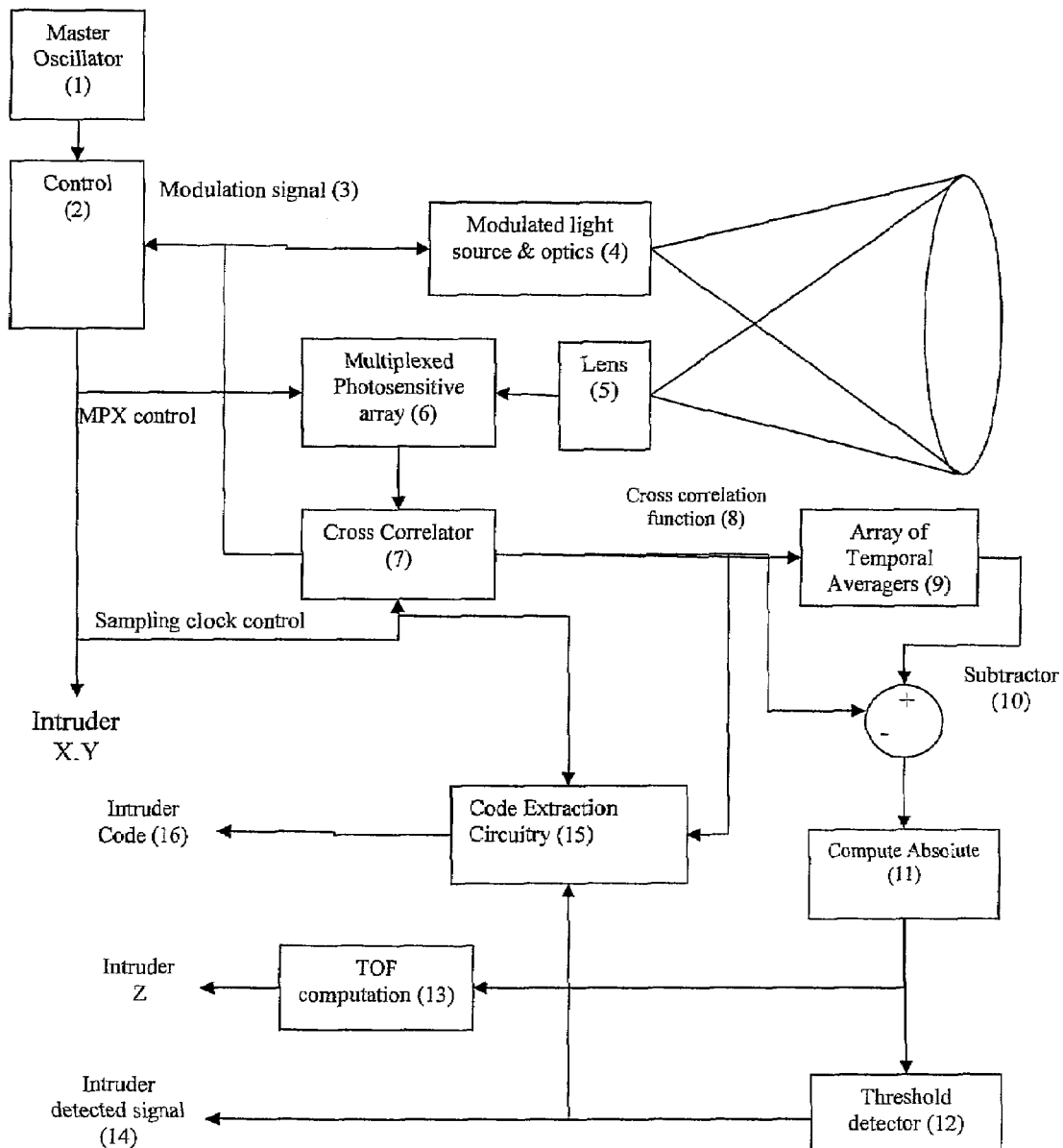
Figure 5:
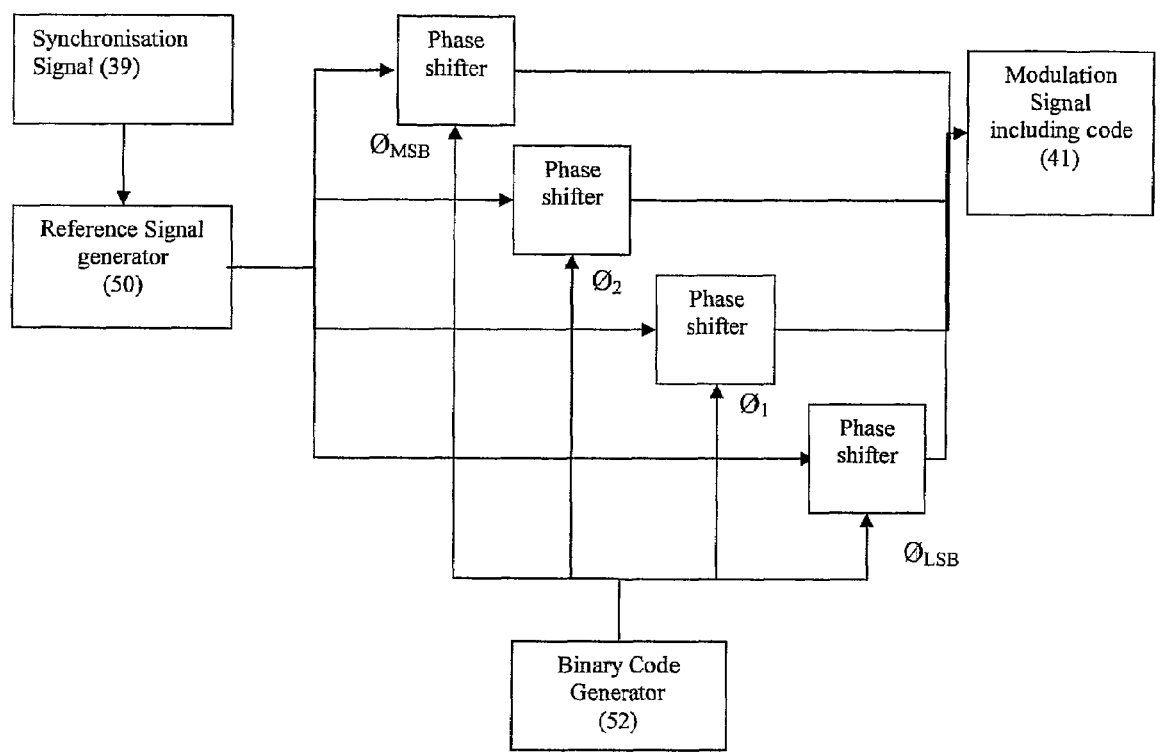
Figure 6:
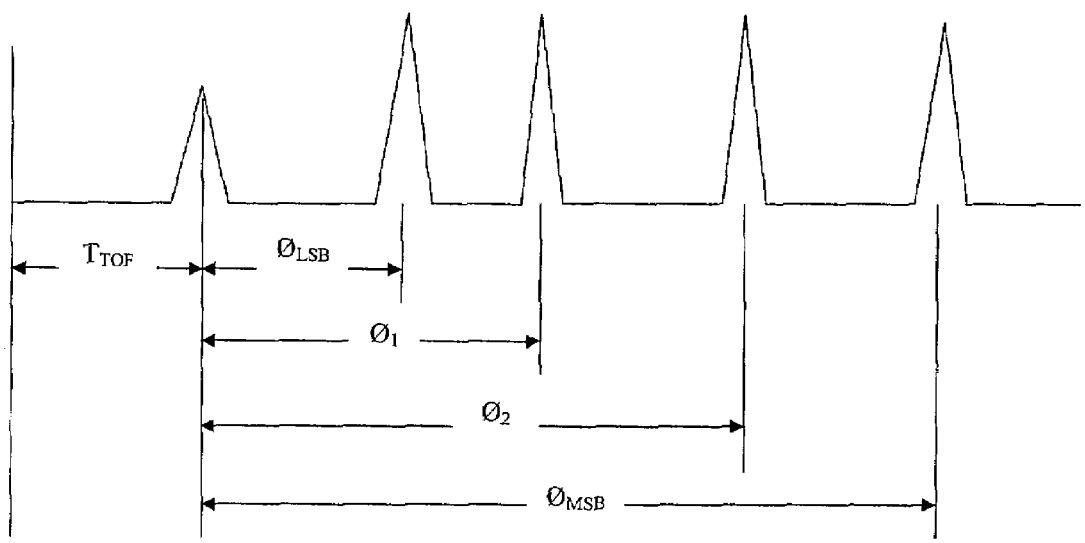

An example of the invention will now be described with reference to the accompanying drawings, in which:
FIG. 1 shows a first example of system of the invention;
FIG. 2 shows additional features to the system of FIG. 1;
FIG. 3 shows a tag for use in a second example of system of the invention;
FIG. 4 shows how the system of invention is modified in the second example;
FIG. 5 shows an example of circuit for generating a modulated code; and
FIG. 6 is a timing diagram to explain the operation of the circuit of FIG. 5.

In one aspect, the invention is based on the technology of optical range finding equipment, particularly using cross correlation calculations to detect peaks, for example for time of flight measurement.

EP 1 373 830 discloses an imaging system which scans a light source output over an object to be imaged, and receives the reflected signal in a multi-region light detector. The light source output is modulated, for example using a maximal length sequence. The time of flight of light signals from the light source to the actuated portion of the detector is calculated by cross correlation analysis for all scanning directions, to enable a three dimensional image of the object to be constructed. This patent discloses the basic optical light source and detector technology which can be employed in the system of the invention.

EP 1 374 002 discloses a way of providing efficient processing of cross correlation signals in a time of flight range finding application. A coarse cross-correlator and a fine cross-correlator can be used for coarsely and more accurately determining the time delay.

An aspect of the invention uses the technologies described in these documents, and they are incorporated herein as reference material.

FIG. 1 shows an example of system of the invention.

A master oscillator 1 determines the sensor sampling frequency. Control electronics 2 generates a modulation signal 3 which is supplied to a modulated light source 4, which may be a laser or light emitting diode (LED) or array of lasers/LEDs with optics if necessary to illuminate the desired field of view.

The reflected received image from the field of view is focused by a lens 5 onto a detector array 6, comprising a multiplexed matrix of photosensitive detector elements (for example photodiodes).

A cross correlator 7 receives the original modulation signal 3 as well as the delayed reflected version, and computes in real time a cross correlation function.

This cross correlation function is determined for each region of the detector 6, for example photodiode or sub-array of photodiodes. The cross correlation function is a series of cross correlation values for different relative time shifts between the two signals. Any peaks in the function represent the presence of objects at a distance related to the time shift at which the peak occurs. The function can have multiple peaks, and the peak heights can be different as a result of different reflectivities.

An array of temporal averagers 9 average the cross correlation function from each selected detector element/group of elements over a defined time period. This provides a set of average cross correlation functions, which represent the field of view.

A subtractor 10 subtracts the real time cross correlation function (namely the one received at any point in time) from the averaged cross correlation function, and this generates a set of cross correlation functions which represent changes from the normal field of view, thereby representing intruders within the field of view.

Changes in the cross correlation function are thus used to provide an intruder detection signal.

A circuit block 11 computes the absolute value of the differences between the real time and the averaged cross correlation functions (as they may be negative), and the resulting difference functions are applied to a threshold detector 12 which is used to generate an intruder detection signal 14.

These components allow a detection signal to be generated.

The system also enables an intruder location to be determined.

If a particular detector element or group of elements is giving rise to the intruder detection, this will correspond to a particular sub-field of view. The controller 2 can thus provide an indication of the direction from the system to the intruder. This is represented as polar X and Y coordinate data. The distance to the intruder in that direction can be obtained by a time of flight computation circuit 13, which can operate in the same way as the earlier patent documents outlined above.

In operation, the modulated light source illuminates the region of interest with the modulated signal in optical form. In a preferred embodiment, the modulation signal is a pseudo random noise signal whose autocorrelation function is a delta function, although other signals such as a "chirp" may be used.

The lens focuses the modulated signal onto the multiplexed array. The control electronics controls the multiplexing of the photosensitive array to select either a single photodetector or group of photodetectors (the active photodetectors) and connect it/them to the cross correlator.

This independent actuation of photodetector elements enables the signal to noise ratio to be improved and is discussed in the references above. The cross correlator then computes the cross correlation function of the modulation signal with the signal detected by the active photodetectors.

This cross correlation function is effectively a map of the reflectivity versus range for the field of view focussed on the active photodetectors.

When the cross correlation function is input to the temporal averager, this acts to average successive cross correlation functions over time from that specific active photodetectors. One temporal averager is required for each of the active photodetectors to be used and each temporal averager must contain sufficient storage to store the complete cross correlation function averaged over an appropriate time period.

The temporal averager can be implemented in many ways, but one simple approach is to add a fraction (1/N) of the captured cross correlation function to (1−1/N) of the signal stored within the temporal averager. The temporal averager smoothes out changes in the cross correlation function over time.

When the signal is subtracted from the "real time" cross-correlation function, any differences due to the presence of intruders are detected.

If an intruder is present then the sensor will provide an alarm signal. By carrying out a time of flight computation on the absolute difference signal, a depth (Z coordinate) of the intruder can be determined together with the polar X,Y coordinates of the intruder based on which photodetector of the detector array is active.

The subtraction of a temporally averaged signal removes any electrical and optical cross talk within the system, increasing system sensitivity.

The system can benefit from an oversampling approach to the modulation signal generation which allows sub-sample distance precision by computing the intersection of the best fit lines applied to the up and down slopes of the resulting signal (i.e. the signal applied to the threshold detector). This is described further in EP 1 252 535.

This example of the invention uses a map of reflectivities with distance, and thereby uses both the surface reflectivity and distance (which combined with the photodetector location in the focal plane gives the 3D physical location) of the features within the field of view.

In contrast, Lidar based solutions simply create a physical map of the surface profile within the sensor field of view and look for changes in that. This requires a very high degree of precision in depth measurement to detect small objects such as a crawling man.

Video motion detection solutions simply create a map of the intensities (due to reflectivity) within the sensor field of view and look for changes in that, without any additional depth information.

The sensitivity of the system described above to intruders, and resistance to false alarms, is determined by the level of spatial resolution, dependent on the number of photodetectors in the detector array (giving X,Y resolution accuracy), and the sampling clock frequency (giving Z resolution accuracy) and temporal averaging applied.

Because the sensor comprises an array of photodetectors it can also be used to capture an image of the intruder.

In addition, the intruder X,Y,Z information can be used to slew a high resolution camera to the correct location to capture a high resolution video or image of the intruder for intruder recognition purposes.

FIG. 2 shows a camera 20 controlled by the system 22 of the invention, in particular based on the intruder detection signal 14 and the location information X,Y,Z for camera direction control and also optionally focus control.

The system described above can be modified to combine detection and identification. More generally, an intruder detection system which emits a modulated signal and detects the reflected signal from an intruder can be extended to combine detection and identification if authorised intruders are provided with an active tag which detects the modulated signal and provides a signal in response which is both detectable by the intruder detection sensor and, by appropriate processing, can convey information stored in the tag such an authorisation key.

This approach has the great benefit that, provided the intruder detector sensor has enough spatial resolution, the signal reflected by the intruder and the signal emitted by the intruder's tag will be spatially co-incident giving a positive identification and correlation between the intruder and the tag.

This approach offers a completely solid state, low cost and reliable sensor for detecting intruders.

One approach to implementing this further aspect of the invention is described below, although it will be recognised that there are other methods of implementing these principles.

The system described above in connection with FIGS. 1 and 2 is provided to illuminate and monitor the field of view.

In addition, an optical tag is provided to and worn by authorised personnel.

The optical tag comprises the following elements, illustrated in FIG. 3:

a sensor 34 to detect a background modulation signal;

a digital signal processor (performing the functions of the cross correlator 35, peak detector 38, and control and timing unit 31) which is used to carry out a cross correlation operation on the detected background signal to derive a cross correlation function 37 and extract a synchronisation signal 39 whose timing will be derived from and tightly linked to the detected background modulated signal;

a code signal generator 40 which generates a second modulation signal whose modulation is phase linked to the synchronisation signal 39 and includes coded data; and an emitter 42 to transmit the second modulated signal.

Thus, it can be seen that the tag responds to an incoming modulation signal and emits a synchronised modulated signal of its own using a key code of the tag.

The intruder detector is modified compared to the arrangement shown in FIG. 1, and the modified detector is shown in FIG. 4.

An additional code extraction circuit 15 is provided, operating on the output of the cross correlator 7, and this enables an intruder code 16 to be determined.

In operation, when an intruder carrying a tag enters the region of interest (ROI), the sensor in the tag detects the background illumination. This signal is processed using the cross correlator 35 whose reference signal 36 has the same shape as the background modulation signal emitted by the intruder detector. However, as the tag and detector sensor are physically separate entities, there will be a timing difference between the signal emitted by the intruder detector (and captured by the tag's sensor 34) and the reference signal generated within the optical tag and so the cross correlator will generate a correlation peak whose position in time represents this timing difference. The peak detector 38 is used to detect the position of the correlation peak The fine/coarse cross correlation methodology mention above and described in EP 1 374 002 can be used to reduce the level of computation and also deliver sub-sample precision in the timing of this peak. A synchronisation signal 39 is generated by this process.

The synchronisation signal is fed into the code generation circuit 40 which because it is now synchronised with the background emission can generate a second modulation signal which contains a key code and is coherent, i.e. phase linked to the background modulation signal. This second modulation signal 41 is then emitted by the tag.

The intruder detector sensor detects the reflection from the intruder and computes the intruder's position and range in the manner explained above.

However, the emission from the tag will also be focussed onto the intruder detector's focal plane array and because it is emitted from the same position as the reflection from the intruder, will be detected by the same photodetector in the array.

When an intruder reflection is detected from a given photodiode, the associated code extraction circuit 15 is enabled which acts to extract any code in the detected signal. If the code is valid, then the intruder is classed as being authorised. Otherwise the intruder is considered to be unauthorised and an alarm is raised.

The code extractor may operate on the signal acquired from the photodiode and/or the cross-correlation signal depending upon the nature of the code emitted by the tag.

Regarding the coding, one simple method would be to use a time division multiplexed approach. In this case, the background modulation signal is configured to have "dead time" within it into which the tag may emit its coded signal. In this case, the code extractor will operate on the signal from the relevant photodiode directly.

A potential disadvantage of this approach is that the energy able to be emitted by the detector is reduced by the proportion of "dead time" allowed, which will limit the maximum range at which intruders can be detected. To overcome this disadvantage, more sophisticated schemes can be employed which take benefit from the precise synchronisation delivered by the cross correlator in the tag.

One such approach is explained with reference to FIG. 5.

In FIG. 5, the synchronisation signal 39 is used to sychronise a reference signal generator 50, whose output is connected to a series of phase shifters, each of which shifts the reference signal by a phase determined by a binary code generator 52. The outputs of the phase shifters are then added together and used to create the modulation signal 41.

When the intruder detector processes this signal, a cross correlation signal will be generated with several peaks. The first peak corresponds to the reflected signal of the intruder, whose time delay is determined by the time of flight and hence range of the intruder. The four peaks which follow have phase shifts relative to the first, reflected signal peak which allow the detector to extract the tag's code. The series of peaks is shown in FIG. 6.

This principle can be extended both by adding additional phase shifters and by changing the phase shifts over time to send more complex data from the tag to the detector.

This approach also allows the optical tag to operate with systems where the phase of the modulation signal is randomly varied to reduce intersystem crosstalk (as described in WO 2006/048604) as the tags cross-correlator output peak will track the modulation signal phase changes and hence automatically resynchronise the code signal phase.

Some examples of the system of the invention has been described, and there are many possible alternatives. The light source is preferably an LED array, although a laser light source may be used, and the output can be modulated by a maximal length sequence or other signal with a distinct auto-correlation function, such as a peak.

The light source can be stationary, with optics to illuminate the desired field of view, or else a scanning light source can be used.

The photosensor array is preferably a photodiode array, and this can be formed as a low cost IC. However, other optical sensors may be used such as CCDs.

The invention has been described as a collection of control blocks. It will be apparent to those skilled in the art that all of the data processing will be implemented by a computer program controlling a digital signal processor.

Various other modifications will be apparent to those skilled in the art.

The invention claimed is:

1. An intruder detection system, comprising:
   an illumination means for illuminating a field of view with a modulated optical signal, modulated by a modulation signal;
   an optical receiver for receiving a delayed reflected signal;
   a cross correlator for calculating a cross correlation function between the modulation signal and the received delayed reflected signal; and
   means for detecting changes in the cross correlation function by comparing the cross correlation function received with an average of previously received cross correlation functions, a change being used to provide intruder detection.

2. A system as claimed in claim 1, wherein the correlation function comprises a series of correlation calculations for different time shift values.

3. A system as claimed in claim 1 or 2, further comprising threshold detection means for threshold detection within a difference signal between the cross correlation function and the average of previously received cross correlation functions.

4. A system as claimed in any preceding claim, wherein the optical receiver comprises an array of photodetectors.

5. A system as claimed in any preceding claim, further comprising time of flight measurement circuitry for calculating a range to an intruder based on the detected changes in the cross correlation function.

6. A system as claimed in any preceding claim, further comprising means for storing an image from the optical receiver.

7. A system as claimed in any preceding claim, further comprising means for deriving a direction to an intruder from the cross correlation function.

8. A system as claimed in claim 7, wherein the optical receiver comprises a multi region photosensor array, and wherein the means for deriving a direction determines which region or regions of the detector result in the intruder detection signal.

9. A system as claimed in claim 7 or 8, further comprising a camera, and a controller for controlling a direction of the camera based on the derived direction.

10. A system as claimed in any preceding claim, further comprising an electronic tag for an authorised intruder, wherein the system is adapted to provide an alarm if a non-authorised intruder is detected, and not to provide an alarm if an authorised intruder is detected.

11. A system as claimed in claim 10, wherein the tag comprises a code generator and optical transmitter, for transmitting a modulated code signal in response to detection of the modulated optical signal.

12. A system as claimed in claim 11, wherein the tag comprises means for synchronising the modulated code signal with the detected modulated optical signal.

13. A system as claimed in claim 12, wherein the means for synchronising comprises a tag cross correlator and a peak detector for deriving a synchronisation signal from the detected modulated optical signal.

14. A system as claimed in any one of claim 10 to 13, further comprising means for extracting a code from the signal received by the optical receiver which receives the delayed reflected signal.

15. A system as claimed in claim 14, wherein the means for extracting a code receives the output from the system cross correlator.

16. An intruder detection system comprising means for emitting a modulated optical signal and detecting a delayed reflected version of the optical signal from an intruder, and further comprising an electronic tag for an authorised intruder, wherein the system is adapted to provide an alarm if a non-authorised intruder is detected, and not to provide an alarm if an authorised intruder is detected.

17. A system as claimed in claim 16, wherein the tag is adapted to detect the modulated signal and provide a signal in response which encodes electronic tag identification information.

18. A method of detecting an intruder, comprising:
illuminating a field of view with a modulated optical signal, modulated by a modulation signal;
receiving a delayed reflected signal;
calculating a cross correlation function between the modulation signal and the received delayed reflected signal; and
detecting changes in the cross correlation function by comparing the cross correlation function received with an average of previously received cross correlation functions, a change being used to provide intruder detection.

19. A method as claimed in claim 18, wherein calculating a correlation function comprises deriving a series of correlation calculations for different time shift values.

20. A method as claimed in claim 18 or 19, further comprising performing threshold detection within a difference signal between the cross correlation function and the average of previously received cross correlation functions.

21. A method as claimed in any one of claims 18 to 20, further comprising performing time of flight measurement to determine a range to an intruder based on the detected changes in the cross correlation function.

22. A method as claimed in any one of claims 18 to 21, further comprising deriving a direction to an intruder from the cross correlation function.

23. A method as claimed in claim 22, wherein receiving a delayed reflected signal comprises operating a multi region photosensor array, and wherein deriving a direction comprises determining which region or regions of the detector result in the intruder detection.

24. A method as claimed in claim 22 or 23, further comprising controlling a direction of a camera based on the derived direction.

25. A method as claimed in any one of claims 18 to 24, further comprising providing an authorised intruder with an electronic tag and providing an alarm if a non-authorised intruder is detected, and not providing an alarm if an authorised intruder is detected.

26. A method as claimed in claim 25, comprising, in the tag, transmitting a modulated code signal in response to detection of the modulated optical signal.

27. A method as claimed in claim 26, comprising, in the tag, synchronising the modulated code signal with the detected modulated optical signal.

28. A method as claimed in claim 27, wherein the synchronising comprises cross correlation and peak detection to derive a synchronisation signal from the detected modulated optical signal.

29. A method as claimed in any one of claims 25 to 28, further comprising extracting a code when receiving the delayed reflected signal.

30. A computer program comprising computer program code means adapted to perform all of the steps of any one of claims 18 to 29 when said program is run on a computer.

31. A computer program as claimed in claim 30 embodied on a computer readable medium.

* * * * *